US008601448B2

(12) United States Patent
Meijer et al.

(10) Patent No.: US 8,601,448 B2
(45) Date of Patent: Dec. 3, 2013

(54) REPRESENTING POINTERS AND BOXING IN ENVIRONMENTS USING ONLY REFERENCE TYPES

(75) Inventors: Erik Meijer, Mercer Island, WA (US); Jeffrey van Gogh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1520 days.

(21) Appl. No.: 11/950,945

(22) Filed: Dec. 5, 2007

(65) Prior Publication Data

US 2009/0150422 A1    Jun. 11, 2009

(51) Int. Cl.
*G06F 9/45* (2006.01)

(52) U.S. Cl.
USPC .......................................................... 717/138

(58) Field of Classification Search
USPC .................................................. 717/134, 138
See application file for complete search history.

(56) References Cited

U.S. PATENT DOCUMENTS

| | | | |
|---|---|---|---|
| 6,345,277 B1 * | 2/2002 | Goldman et al. | 707/100 |
| 6,738,968 B1 | 5/2004 | Bosworth et al. | |
| 6,862,730 B1 | 3/2005 | Gorti et al. | |
| 7,168,063 B2 | 1/2007 | Meijer | |
| 7,840,937 B1 * | 11/2010 | Chiluvuri | 717/106 |
| 2004/0221280 A1 | 11/2004 | Bolton et al. | |
| 2005/0198624 A1 * | 9/2005 | Chipman | 717/146 |
| 2006/0015528 A1 | 1/2006 | Hejlsberg et al. | |
| 2006/0053138 A1 | 3/2006 | Meijer et al. | |
| 2006/0130016 A1 * | 6/2006 | Wagner | 717/136 |
| 2006/0225053 A1 | 10/2006 | Lakshman et al. | |

OTHER PUBLICATIONS

Pataki et al, Towards soundness examination of the C++ Standard Template Library, 2006, Proc. of Electronic Coputers and Informatics, ECI, pp. 186-191.*
K. Traehos, et al., A class hierarchy emulating virtual shared objects on message-passing 1-20 systems• 1995. Proceedings Euromicro Workshop on Parallel and Distributed Processing, Jan. 25-27, 1995.
International Search Report in corresponding PCT Application No. PCT/US2008/084962, dated Jun. 18, 2009, 11 pages.
R. Stanton, "Decompiler Round-Up, Regenerating Your Code" dotnetdevelopersjournal.com, Aug. 2004.
"B#—A Programming Language for Small Footprint Embedded Systems Applications: Part 1", Date: Oct. 5, 2006, http://www.embedded.com/showArticle.jhtml?articleID=183700818.
Henglein, et al., "Formally Optimal Boxing", Proceedings of the 21st ACM SIGPLAN-SIGACT symposium on Principles of programming languages, Date: 1994, pp. 213-226, ACM, New York, USA.

(Continued)

*Primary Examiner* — Li B Zhen
*Assistant Examiner* — Bradford Wheaton (57) ABSTRACT

An arrangement by which pointers may be represented in a restricted software execution environment that provides access to only reference types but not pointers is realized by modeling both pointers and value type boxing using a set of boxes (i.e., containers) which describe how to retrieve the value associated with the pointer, and emitting code for accessing the set of boxes. A decompiling and recompiling process is utilized in which code arranged to run in an execution environment that supports pointers is scanned to reveal pointer and boxing usage. In one illustrative example, code is responsively emitted to create one or more specific boxes. At runtime in the restricted execution environment, an instance of a box class is created to thus emulate a pointer to the value.

19 Claims, 5 Drawing Sheets

(56) References Cited

OTHER PUBLICATIONS

Kennedy, et al., "Design and Implementation of Genetics for the .NET Common Language Runtime", Proceedings of the ACM SIGPLAN 2001 conference on Programming language design and implementation, Date: 2001, pp. 1-12, ACM, New York, USA.

Meijer, et al, "Technical Overview of the Common Language Runtime", Date: 1995.

Minamide, et al., "On the Runtime Complexity of Type-Directed Unboxing", Proceedings of the third ACM SIGPLAN international conference on Functional programming, Date: 1998, pp. 1-12, ACM, New York, USA.

Liblit, et al., "Type Systems for Distributed Data Sharing", University of California, Berkeley, 2003.

* cited by examiner

REPRESENTING POINTERS AND BOXING IN ENVIRONMENTS USING ONLY REFERENCE TYPES

BACKGROUND

In a typical high level programming language, for example one falling under the Microsoft .NET software development platform, the data type of a programming element refers to what kind of data it can hold and how it stores that data. Data types apply to all values that can be stored in computer memory or participate in the evaluation of an expression. Thus, every variable, literal, constant, enumeration, property, procedure parameter, procedure argument, and procedure return value will typically have a data type. A data type is a value type if it holds the data within its own memory allocation. By comparison, a reference type contains a pointer to another memory location that holds the data.

In .NET, reference types are allocated on the program heap—that section of memory that may persist past the current function or thread. A caller for the creation of a reference type will get back the pointer to the object or the address of the object's memory in the heap. The pointer uses a small amount of memory, for example four bytes, on the program stack which is a memory section that exists for the currently executing part of the program, and which typically holds reserved space for local variables and arguments during procedure calls.

Value types may typically be allocated on the program stack. When a function executes, all of the value types it uses are known before hand, and are laid out before execution begins in the function. In addition, the memory allocated to value types is released when the function finishes (i.e., returns). Accordingly, a copy of the memory is returned to the caller and the value types passed to a function are copied.

Boxing and unboxing may be viewed as a special form of copying for value types in .NET. Boxing takes a value type inside a wrapper (i.e., a "box") where it can then behave like a heap object. Thus by wrapping value types as heap objects, a value type can be used as if it were a reference type. A boxed value type instance can also be converted back to its original form (i.e., unboxing).

By comparison to .NET, other execution environments (such those using JavaScript) only give programmers access to reference types, but not their underlying pointer representations. Such restrictions may be justified to safeguard against security breaches that could occur through misuse of pointers to gain improper access to memory addresses. Nor do these execution environments support value type boxing. However, for .NET code to be executed in such alternative environments, support for the constructs of pointers and boxing needs to be provided.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An arrangement by which pointers may be represented in a restricted software execution environment that provides access to only reference types but not pointers is realized by modeling both pointers and value type boxing using a set of boxes (i.e., containers) which describe how to retrieve the value associated with the pointer, and emitting code for accessing the set of boxes. A decompiling and recompiling process is utilized in which code arranged to run in an execution environment that supports pointers is scanned to reveal pointer and boxing usage. Code is responsively emitted to create one or more specific boxes. At runtime in the restricted execution environment, an instance of a box class is created to thus emulate a pointer to the value.

In various illustrative examples, models are provided for five specific examples under the .NET framework in which a pointer refers to a memory address, including instance fields, static fields, array elements, method arguments and local variables. In addition, .NET value type boxing is supported using the containers in a similar manner as with the emulated pointers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
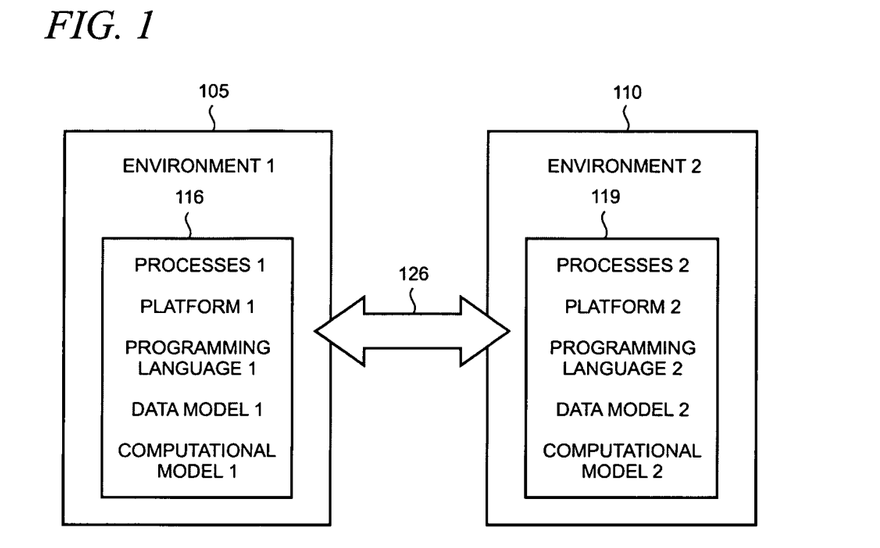
FIG. 1 shows two illustrative software execution environments that have different characteristics.

FIG. 1 shows several illustrative software execution environments, indicated by reference numerals 105 and 110 respectively, in which the present arrangement for representing pointers and boxing may be implemented. Execution environments 105 and 110 can typically be expected to differ in one or more characteristics which may include, for example, processes running in the environment, the computing platform utilized, programming language supported, data model supported, and the computational model that is utilized. The characteristics of each software execution environment are indicated by reference numerals 116 and 119, as shown.

As shown by arrow 126, a developer may wish to support features and functionality provided by execution environment 105 (i.e., the original environment) in the other execution environment 110 (i.e., the target environment). The adapting of features and functionalities across execution environments is generally possible using a variety of techniques. Varying degrees of success are realized which can often depend, for example, on the limitations of the respective environments, the complexity of the program code sought to be adapted, and the abilities of the developer to rewrite or adjust the code as required to execute in the new environment.

Figure 2:
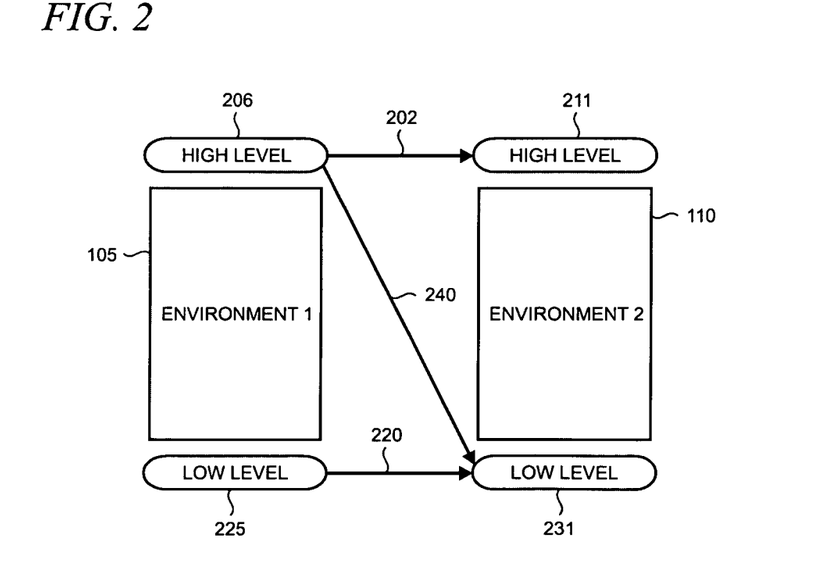
FIG. 2 shows several illustrative paths by which code may typically be translated across execution environments.

As indicated by line 202 in FIG. 2, such adaptation can typically be implemented by porting high level code 206 written to run in the original environment (e.g., execution environment 105) to high level code 211 that runs in the target environment (e.g., execution environment 110). For example, high level code 206 might be Java code and code 211 is JavaScript that executed inside a web browser. A Java to JavaScript compiler is utilized to enable the web application to be created using the Java code. Of course, different compilers would be needed to port other high level code across environments. Developing such compilers can be complex and costly to be able to provide for all of the capabilities of the high level code in the original environment. The availability of such compilers can thus be a limiting factor for this particular high level to high level approach.

It is noted that the terms "high level" and "low level" are typically relativistic terms, and application of these terms tends to evolve with time so that programming languages/code that were once considered high level are now considered low or intermediate level. However, as used here, low level code is that which is closer to the instructions that run on the platform in the execution environment, while high level code is closer to what a developer uses to implement a given functionality. High level code is thus typically expressed using a greater degree of abstraction relative to the low level code.

As indicated by line 220, low level code 225 (e.g., assembly language code) originally compiled to run in the original environment 105 may be translated into low level code 231 which runs in the target environment 110. This approach can often be advantageous as the code flow between the original and target can match closely. Low level code 225 might be, for example, IL (Intermediate Language), and low level code 231 is JVM executable code (i.e., Java byte code) which runs in a Java execution environment. However, not all execution environments allow access to low level code in all circumstances. For example, while native JavaScript is allowed to run, it may not be desirable to allow translated low level Java byte code to run in the target environment 110 to protect against the execution of erroneous or intentionally malicious code.

Low level code may alternatively be left in its original form and run on an emulator set up in the target environment 110 to simulate the original conditions in the original environment 105. This approach may be used, for example, when the hardware platforms differ between the execution environments. While no changes to the original low level code (e.g., object code) are generally required, significant performance penalties at runtime may be experienced as every machine instruction from the original low level code must be read, decoded, and then emulated in the target environment 110.

Cross-environment code porting may also be accomplished by recompiling high level code 206 into new executable low level code for the target environment 110. While this may be straightforward in some cases, the non-portable or system-dependent portions of the high level programming code may often need to be modified which can often be difficult, particularly when different runtime platforms are utilized in the execution environments. In addition, the potential problem with restrictions on low level code access still exists.

Figure 3:
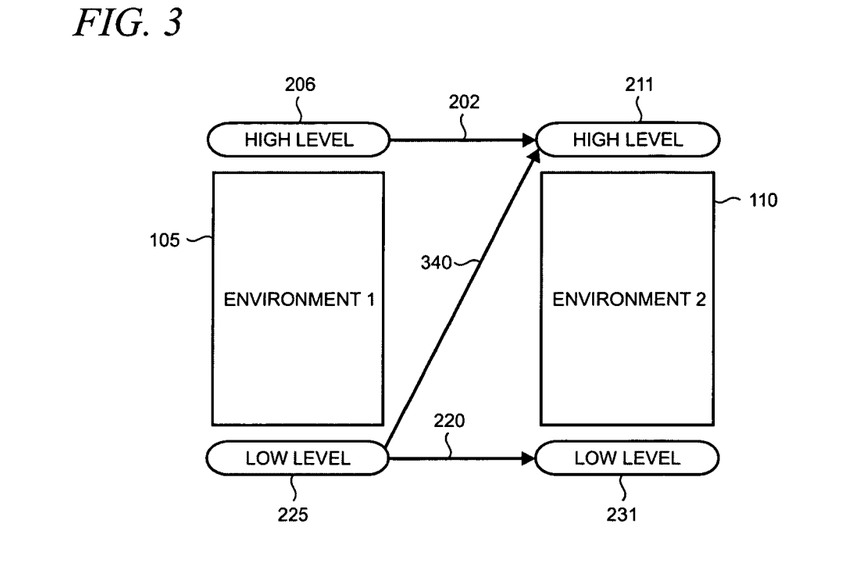
FIG. 3 shows an illustrative path by which code is translated across execution environments in accordance with the present arrangement for representing pointers and boxing.

FIG. 3 shows an illustrative path 340 by which low level code 225 is translated across execution environments to high level code 211 in accordance with one aspect of the present arrangement for representing pointers and boxing. Here, the low level code 225 is decompiled and then recompiled into high level code 211. During the decompiling/recompiling process, a set of functionalities that are supported in execution environment 105 are abstracted into the high level code 211 which would otherwise have no native support for the functionalities.

Figure 4:
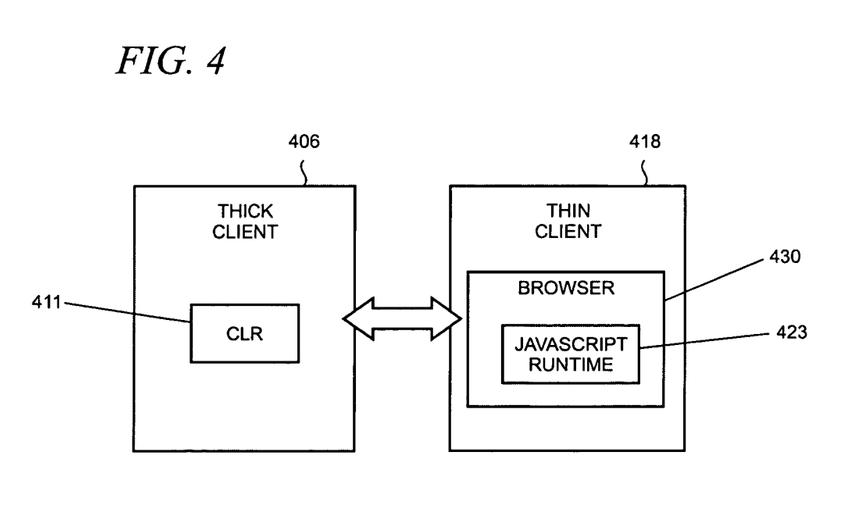
FIG. 4 shows an illustrative example where one execution environment is implemented on a thick client with a Common Language Runtime ("CLR"), and another execution environment runs on a thin client with a JavaScript runtime environment implemented in a browser.

FIG. 4 shows a specific illustrative example of the general approach shown in FIG. 3. In this example, the original execution environment is provided by a thick client platform 406 that uses the CLR 411 as its runtime environment. A possible scenario could be that executable code such as IL running in the CLR 411 that was originally developed for the thick client 406 is desired to be run in another environment. In this example, the other environment is provided by a thin client platform 418 (i.e., one that might have access to comparatively fewer resources or be configured with fewer features and functionalities than the thick client 406) that uses a JavaScript runtime environment 423 implemented in a browser 430. Generally, it is desired to support as much functionality from the CLR 411 as possible in the JavaScript runtime 423 so that an application written in .NET can be easily picked up and run as JavaScript, for example, on the thin client 418.

It is emphasized that the environments, platforms, and programming code shown in the drawings are illustrative and merely used to highlight various aspects of the present arrangement and should not be construed as limiting the principles described herein to only such environments.

Figure 5:
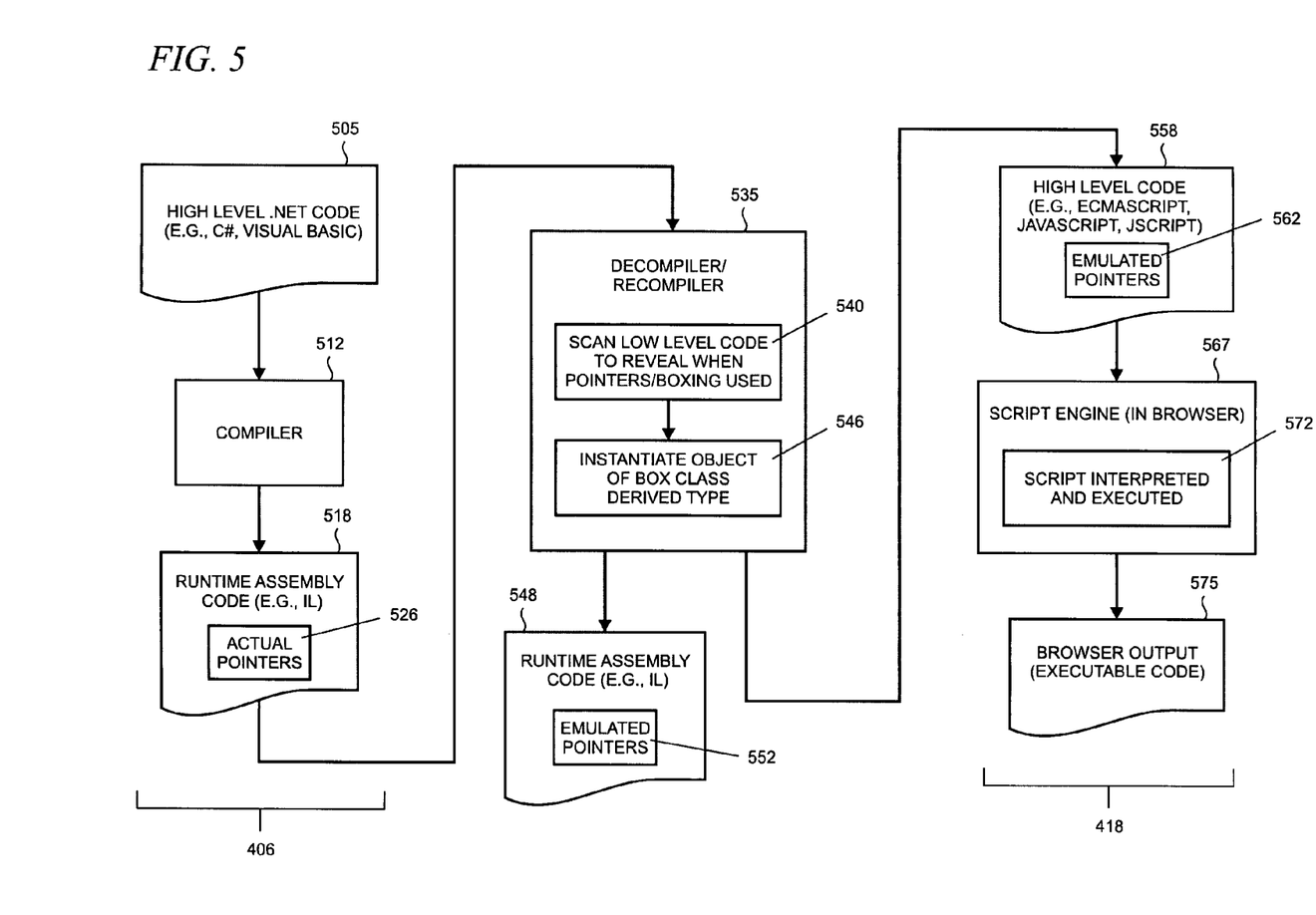
FIG. 5 shows details of an illustrative process flow by which low level code is decompiled and recompiled into high level and low level code that includes emulated pointers.

Client platform 406 in this example, as shown in FIG. 5, uses high level .NET code 505 such as C# (C Sharp) or Visual Basic that is conventionally compiled by a compiler 512 to generate low level runtime assembly code 518 such as IL. As noted above, pointers and boxing is supported in .NET so actual (i.e., regular) pointers 526 are included as part of the runtime assembly code 518. As pointers and boxing of value types are not supported by JavaScript on the thin client 418, pointers and boxing needs to be modeled so that code may be executed that matches the developer's intended design goals.

Pointers and boxing expressed in IL are modeled in a target high level language using a set of boxes (i.e., containers) that describe how to retrieve the value associated with the pointer, and then emitting the appropriate code to access the boxes. This is accomplished using a process that runs on a decompiler/recompiler 535. Decompiler/recompiler 535 decompiles the IL and generates corresponding code for each instruction in a recompiling process. During the recompiling, the low level IL code is scanned for pointer and boxing usage as indicated by reference numeral 540. As shown by reference numeral 546 the decompiler/recompiler 535 instantiates an object of a box class derived type as required to model a given actual pointer 526.

The low level code 518 can be recompiled into one of several different forms. For example, it can be recompiled into another instance 548 of the same low level language (e.g., IL) originally used, with the exception that the actual pointers 526 are replaced by emulated pointers 552. Using the recompiled code in the original environment 406 can be beneficial in several illustrative contexts. These include, for example, debugging where the developer could set a break point at each read and write of a memory address. These read and writes are surfaced when an emulated pointer is utilized. Similarly, memory utilization can be tracked, and security analyses performed on pointer utilization and manipulation during runtime.

The low level code 518 is further capable of being recompiled into high level code 558 that can run in the execution environment illustratively provided by thin client 418. In this example, the high level code 558 is provided by a scripting language that provides functionality to web pages, such as JavaScript or JScript (i.e., EMCAScript). The recompiling process in this example generates corresponding JavaScript for each instruction in the low level IL 518. And as with the recompiling example above, the actual pointers 526 are replaced by emulated pointers 562.

A script engine 567 can then interpret the JavaScript 558 as indicated by reference numeral 572 to generate browser output 575 required to render a web page.

As a pointer provides a memory address of a value, it may be viewed as an indirection to a value. Under the .NET framework, there are several cases where pointers are utilized to refer to a given memory location. Each of these cases must be supported using by a discrete pointer model in order for the developer's intent for the original .NET code to be realized when run in its recompiled JavaScript form using the emulated pointers. However, while JavaScript is used in this particular illustrative example, it is emphasized that the recompilation into other high level languages may be performed depending on the requirements of a particular implementation.

The cases along with their corresponding IL instruction(s) are shown below in Table 1.

TABLE 1

| Memory Location | .NET IL instruction(s) |
|---|---|
| Instance field | Ldflda |
| Static field | Ldsflda |
| Array element | Ldelema |
| Method argument | Ldarga, ldarga.s |
| Local variable | Ldloca, ldloca.s |

As noted above, since JavaScript restricts access to the memory address of any value using pointers, an alternative indirection needs to be provided to model pointer functionality. For the first three cases of instance field, static field, and array element, indirections that enable reading and writing of the value may be utilized as shown below in Table 2.

TABLE 2

| Memory Location | Alternative Indirection |
|---|---|
| Instance field | Instance object & field name |
| Static field | Type description & field name |
| Array element | Array object & array index |

In an illustrative example the desired pointer behavior may be modeled using an abstract base class defined in the original code (i.e., C#/IL) that provides the set of boxes:

```
public class Box : VoltaObject
{
    public Box(TypeDef type)
        : base(type, false)
    {
```

```
}
[Import]
public extern BoxReader Read
{
    get;
    set;
}
[Import]
public extern BoxWriter Write
{
    get;
    set;
}
}
``` where BoxReader and BoxWriter are delegates that each box has to provide that implement reading/writing of the value of a box.

These delegates are defined as follows:

```
public delegate Object BoxReader( );
public delegate void BoxWriter(Object value);
```

For a memory location associated with an instance field, a class deriving from Box is defined:

```
public class PointerToObjectField : Box
{
    private VoltaObject m__object;
    private string m__field;
    public PointerToObjectField(VoltaObject @object, string field, TypeDef type) : base(type)
    {
        Read = Reader;
        Write = Writer;
        m__object = @object;
        m__field = field;
    }
    private Object Reader( )
    {
        return m__object[m__field];
    }
    private void Writer(Object value)
    {
        m__object[m__field] = value;
    }
}
```

Figure 6:
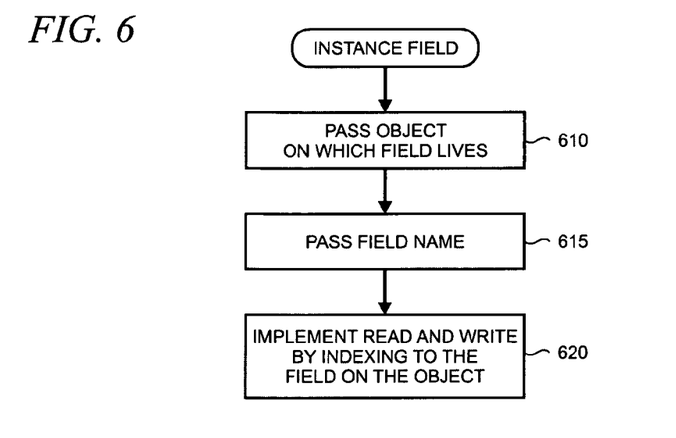
FIG. 6 shows an illustrative method by which a pointer to an instance field is modeled.

As shown in the flowchart in FIG. 6, for the case of an instance field, a pointer is modeled by passing the object on which the field lives (610) and the name of the field (615). The reading and writing of the value are implemented by indexing to the field on the object (620).

For static fields, the derived class is:

```
public class PointerToStaticField : Box
{
    private string m__field;
    private TypeDef m__declaringType;
    public PointerToStaticField(TypeDef declaringType, string field, TypeDef fieldType) : base(fieldType)
    {
        Read = Reader;
        Write = Writer;
        m__declaringType = declaringType;
        m__field = field;
```

```
        }
        private Object Reader( )
        {
            return m__declaringType.Fields[m__field];
        }
        private void Writer(Object value)
        {
            m__declaringType.Fields[m__field] = value;
        }
    }
```

Figure 7:
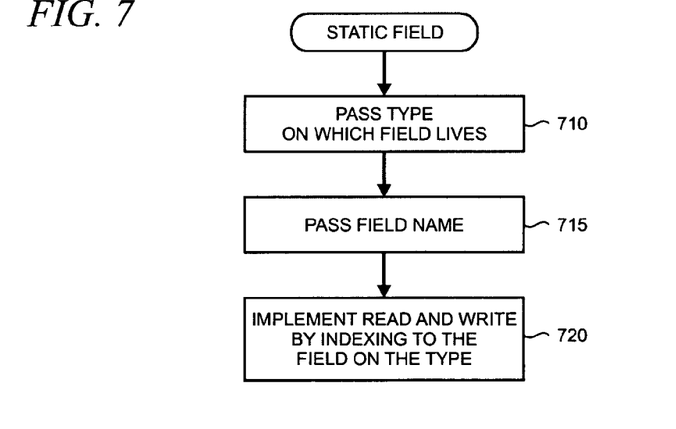
FIG. 7 shows an illustrative method by which a pointer to a static field is modeled.

As shown in the flowchart in FIG. 7, for the case of a static field, a pointer is modeled by passing the object on which the field lives (710) and the name of the field (715). The reading and writing of the value are implemented by indexing to the field on the Type (720).

For array elements, the derived class is:

```
public class PointerToArrayElement : Box
    {
        private Volta.JavaScript.Array m__array;
        private int m__index;
        public PointerToArrayElement(Volta.JavaScript.Array array,
    int index) : base(array.GetVoltaElementType( ))
        {
            this.Read = Reader;
            this.Write = Writer;
            m__array = array;
            m__index = index;
        }
        private Object Reader( )
        {
            return m__array[m__index];
        }
        private void Writer(Object value)
        {
            m__array[m__index] = value;
        }
    }
```

Figure 8:
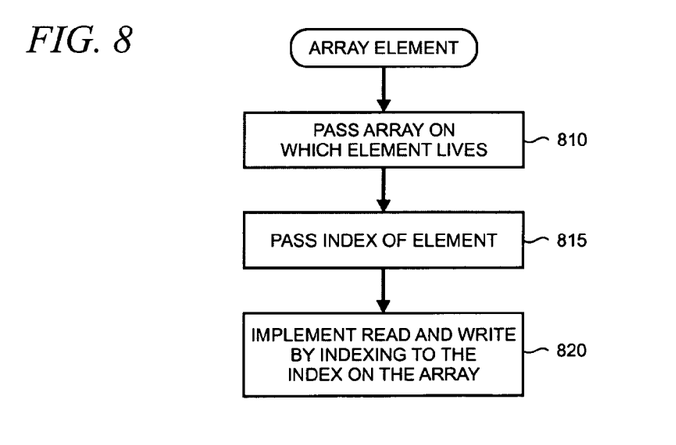
FIG. 8 shows an illustrative method by which a pointer to an array element is modeled.

As shown in the flowchart in FIG. 8, for the case of an array element, a pointer is modeled by passing the array on which the element lives (810) and the index of that element (815). The read and write of the value are implemented by indexing to the index on the array (820).

For the last two cases of method argument and local variable, the indirections are provided using closures which are supported by JavaScript as it is not possible to perform random access to variables and arguments from other methods. Closures enable functions to be created on the fly inside a function which can be assigned to a variable or argument. Thus, for example, one can write:

```
            function demo(a)
            {
                var v=3;
                var anonymous = function( )
                {
                    alert(a);
                    alert(v);
                }
            }
``` where the anonymous function that is nested inside the function demo can access variables (v) and arguments (a) from its container function.

This mechanism may be used to create indirections to local variables and arguments by defining two helper functions for each item requiring a pointer. Thus, for example:

```
            function demo2( )
            {
                var x =3;
            }
            becomes:
            function demo2( )
            {
                var x =3;
                var readX = function( ) { return x; };
                var writeX = function(value) { x = value; };
            }
```

These two helper functions may be freely passed around to read and write the value of x so as to effectively serve as a pointer to the variable x. The decompiler/recompiler 535 is arranged to emit these helper functions inside the generated function right after the variable declaration, when a scan of methods in the low level IL code reveals that pointer access to a local variable or argument is required.

The derived box class for pointers to local variables and method arguments is:

```
    public class PointerToVariable : Box
        {
            public PointerToVariable(BoxReader reader, BoxWriter writer,
        TypeDef type) : base(type)
            {
                Read = reader;
                Write = writer;
            }
        }
```

Figure 9:
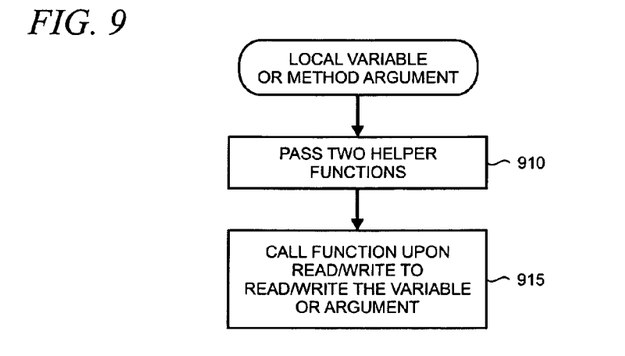
FIG. 9 shows an illustrative method by which pointers to a local variable or method argument are modeled.

As shown in the flowchart in FIG. 9, for the cases of local variable and method argument, a pointer is modeled by passing the two helper functions (910) that are emitted by the decompiler/recompiler when the scan reveals pointer access to a variable or argument. Upon a read or write, the helper functions are called which leads to a read or write of the variable or argument (915).

Once the pointers are generated using the models described above, they may be passed around and accessed in a manner that is the same for all pointers, regardless of the type of memory that they describe. Pointers are also passed around as a single object and the value of the pointer may be read using the ldind* instructions and written using the stind* or stobj IL instructions. In addition, each pointer has information which describes the value type.

During the code generation and recompiling process in the decompiler/recompiler 535, calls to one of the five sets of IL instructions that read the pointer of a specific memory address, result in the decompiler/recompiler 535 emitting the code to create one of the five derived box classes described above. At runtime, that instance is created acting as the pointer to the value.

Similarly, calls to ldind are replaced with a read of the Box.Read property followed by a call to the retrieved delegate. Calls to stind/stobj are replaced with a read of the Box.Write property followed by a call to the retrieved delegate. This process thus provides complete support for pointers without using actual pointers.

As described above, pointers may be modeled using a set of boxes. The mechanism of .NET value type boxing may be modeled in a similar manner. Value type boxing under .NET enables a value that is normally stored on the stack to be placed on the heap. The main difference between pointers and .NET boxing is that boxing does not allow for the value inside the box to be changed. And, the value in the box is a copy of the original value, instead of a reference to the original value. Otherwise, the two are so similar that .Net even allows for optimizing code inside value types by always treating the value to be a pointer (using the ldind* instructions to read the value). Accordingly, a class representing value type boxes is defined as follows:

```
public class ValueTypeBox : Box
{
    private object m__value;
    public ValueTypeBox(object value, TypeDef type)
        : base(type)
    {
        m__value = RuntimeHelpers.OneLevelClone(value);
        Read = Reader;
        Write = Writer;
    }
    private Object Reader( )
    {
        return m__value;
    }
    private void Writer(Object value)
    {
        throw new NotSupportedException( );
    }
}
```

Figure 10:
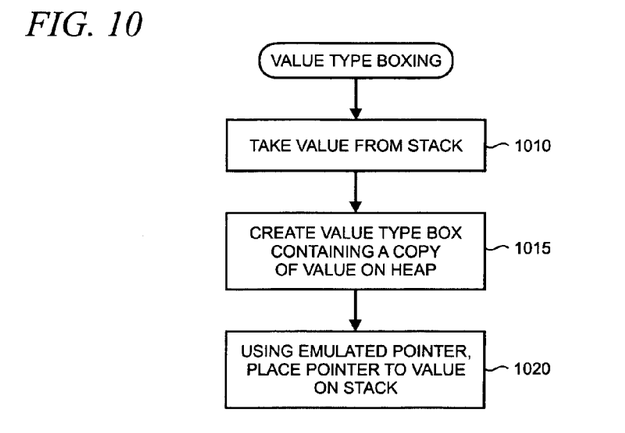
FIG. 10 shows an illustrative method by which pointers may be used for value type boxing.

As shown in the flowchart in FIG. 10, to perform value type boxing, type information needs to be added as this is not stored on the stack. Placing the value on the heap is performed by the box instruction. It takes a value from the stack (1010), creates a typed box containing a copy of that value on the heap (1015) and places an emulated pointer to that value on the stack (1020).

Emitting calls to objects in the ValueTypeBox class, when finding box/unbox instructions, could be subject to complications. As .NET 2.0 supports generics that could contain value types, the box and unbox instructions can be called on non-boxable objects, leading the instructions to be a no-op. In order to detect if such situation is occurring, the decompiler/recompiler 535 does not emit a direct call to the ValueTypeBox class, but rather to two helper functions that check whether the type of the object is a value type or not. If it is a value type, the ValueTypeBox type is called, otherwise the original value is returned.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for emulating functionality from pointers or value type boxing in a restricted execution environment, the method comprising:
   generating a set of containers, each container emulates functionality of a pointer or value type boxing by holding information that describes one or more methods that retrieve a value associated with the pointer or value type boxing,
   a given container within the set being associated with a given memory location; and
   representing one or more of the containers into code so that pointers and boxing functionality is emulated in the restricted execution environment when the code executes at runtime,
   wherein the restricted execution environment does not provide support for a pointer and value type boxing,
   wherein the code executes in the restricted execution environment.

2. The method of claim 1 in which the memory location is an instance field and including the further steps of passing an object on which the instance field lives, passing a name of the instance field, and implementing reads and writes by indexing to the instance field on the object.

3. The method of claim 1 in which the memory location is a static field and including the further steps of passing a type on which the static field lives, passing a name of the static field, and implementing reads and writes by indexing to the static field on the type.

4. The method of claim 1 in which the memory location is an array element and including the further steps of passing array on which the array element lives, passing an index of the array element, and implementing reads and writes by indexing to the index on the array.

5. The method of claim 1 in which the memory location is a method argument or local variable and including a further step of emitting code for generating functions for respectively setting and returning values of the method argument or local variable.

6. The method of claim 5 including the further steps of calling the functions to read and write the method argument or local variable.

7. The method of claim 5 in which the functions are generated using a closure.

8. A method for recompiling low level code into target code that utilizes emulated pointers, the method comprising the steps of:
   scanning the low level code to identify a method that accesses a memory location using a pointer;
   responsively to the scanning, emitting code to create a class that is derived from an abstract base class defining a set of boxes for containing descriptions of methods for retrieving values for the emulated pointers during runtime of the target code in a restricted execution environment, the derived class defining a box that is associated with the pointer, the boxes each providing a delegate for reading a value in the container and a delegate for writing a value to the box,
   wherein the low level code is written to execute in an execution environment that supports pointers and type boxing,
   wherein the target code is written to execute in an execution environment does not support pointers and type boxing.

9. The method of claim 8 in which the recompiling comprises recompiling the low level code into its original form with the emulated pointers.

10. The method of claim 9 including a further step of performing one of security analysis, memory utilization analysis, or debugging using the recompiled low level code with emulated pointers.

11. The method of claim 8 in which the recompiling comprises recompiling the low level code into high level code.

12. The method of claim 11 in which the low level code is IL and the high level code is JavaScript or JScript.

13. The method of claim 8 including a further step of translating instructions contained in the low level code into corresponding instructions in the target code.

14. The method of claim 13 comprising a further step of including a description of a value type in the box.

15. A method for emulating value type boxing in an execution environment where boxing is unsupported, the method comprising the steps of:

using a set of value type boxes that are generated as instances of a class that represents value type boxes, the class being created by code emitted during a code generation process by which pointers from original code are emulated during runtime of the target code by use of a container which describes how to retrieve values for the pointers from memory locations;

copying a value from a memory stack to a value type box in the set;

placing the value type box on a memory heap; and placing an emulated pointer to the value on the memory stack, wherein the original code is written to execute in an execution environment that supports value type boxes, wherein the target code is written to execute in an execution environment that does not support pointers or value type boxes.

16. The method of claim 15 in which the container comprises a box that is an instance of a box class that is derived from an abstract box base class, derived box classes being defined for respective ones of memory locations.

17. The method of claim 16 in which the memory locations are selected from one of instance field, static field, array element, method argument, or local variable.

18. The method of claim 17 including a further step of executing instructions generated during the code generation process, the instructions being translated from the original code.

19. The method of claim 18 in which the executed instructions are provided in the form of high level code.

* * * * *